(12) United States Patent
Kim

(10) Patent No.: US 7,369,569 B2
(45) Date of Patent: May 6, 2008

(54) SMALL-SIZED BASE STATION CONTROLLER PROVIDING FLEXIBLE BOARD DESIGN AND CONTROLLING METHOD THEREOF

(75) Inventor: Ki-Wook Kim, Gunpo-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 1019 days.

(21) Appl. No.: 10/756,283

(22) Filed: Jan. 14, 2004

(65) Prior Publication Data

US 2004/0228322 A1 Nov. 18, 2004

(30) Foreign Application Priority Data

Jan. 15, 2003 (KR) .................. 10-2003-0002825

(51) Int. Cl.
- *H04J 15/00* (2006.01)
- *H04B 7/00* (2006.01)
- *H04B 1/38* (2006.01)
- *H04Q 7/00* (2006.01)
- *H04M 1/00* (2006.01)

(52) U.S. Cl. .................. 370/466; 455/560; 370/310.2
(58) Field of Classification Search .................. 370/466
See application file for complete search history.

(56) References Cited

U.S. PATENT DOCUMENTS

2001/0033555 A1* 10/2001 Kim et al. .................. 370/328

2004/0024942 A1* 2/2004 Smith et al. .................. 710/305

FOREIGN PATENT DOCUMENTS

| JP | 11-069445 | 3/1999 |
|---|---|---|
| JP | 2001-245333 | 9/2001 |

* cited by examiner

*Primary Examiner*—Chau Nguyen
*Assistant Examiner*—Andrew Chriss
(74) *Attorney, Agent, or Firm*—Robert E. Bushnell, Esq.

(57) ABSTRACT

A base station controller and method controlling the same wherein the base station can be small-sized in order that it is to be installed in a rack of a private base station and the number of boards installed in a backboard can be flexibly increased or decreased according to a subscriber capability, the small-sized base station controller providing a flexible board design, comprising: a Network Synchronization clock distribution Block (NSB) for generating a plurality of system synchronization clocks and network synchronization clocks using a synchronization clock received from a GPS satellite and distributing the clocks to each shelf in the base station; an Air Termination Processor (ATP) block to be used to match with a mobile terminal in a wireless environment; a TAB block (TransCord & ATM E1/T1 Link Block) having an ALB block (ATM E1/T1 Link Block) for providing an interface between networks and a TCB (TransCord Bank) block for processing a voice compression signal transmitted through a base station from the mobile terminal and PCM data transmitted to an exchange; and an MCB block (Main Control Block) for loading corresponding OSs (Operating Systems) with respect to the NSB block, ATP block and TAB block using backboard identifiers, and collecting switching of signals and all generated alarm signals.

14 Claims, 6 Drawing Sheets

| A C M A | T C L A | T C L A | A E T A | A E T A | A E T A |

| A C M A | T C L A | T C L A | T C L A | A E T A | A E T A |

FIG. 5C

| A C M A | T C L A | T C L A | T C L A | T C L A | A E T A |

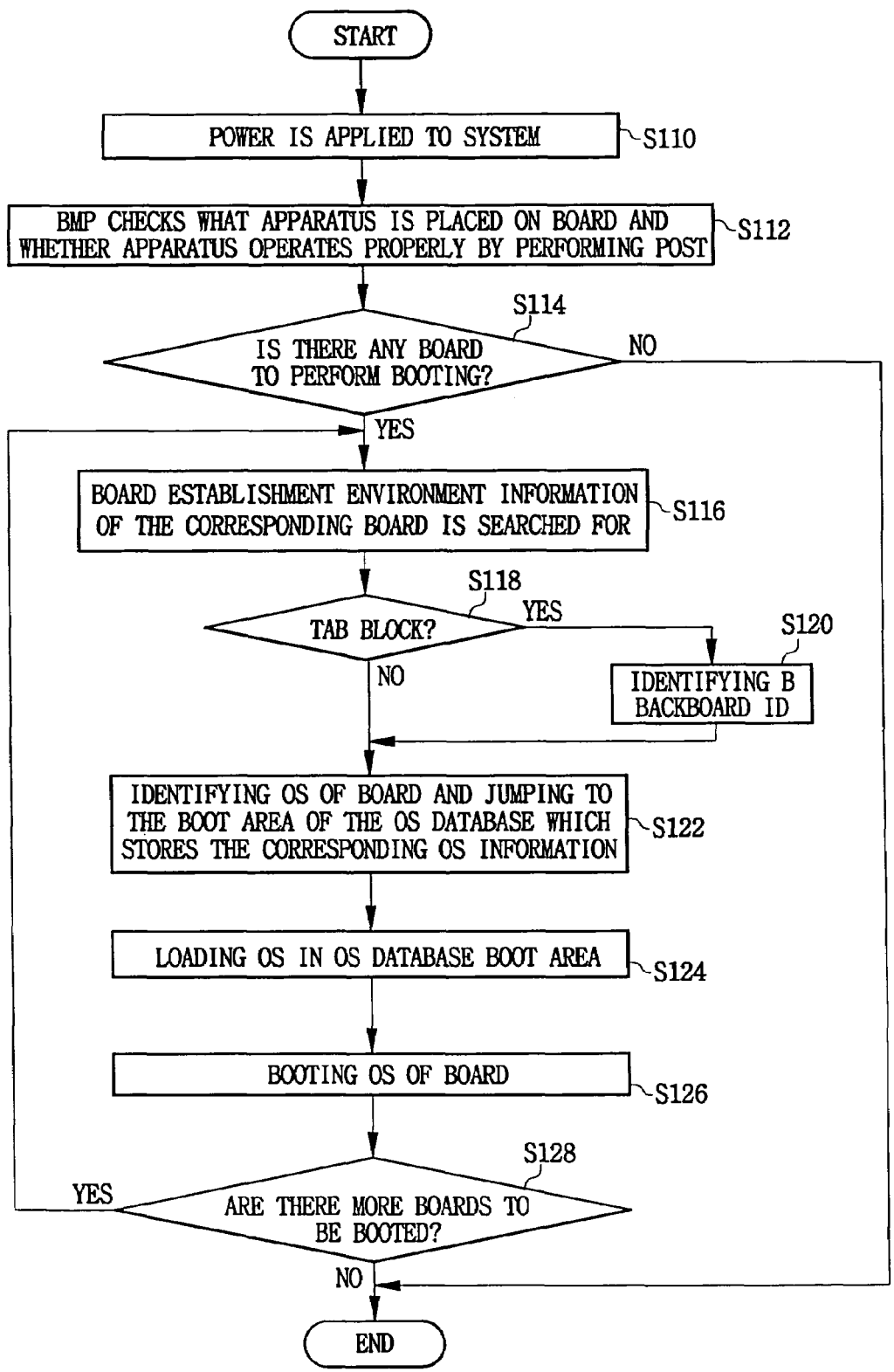

SMALL-SIZED BASE STATION CONTROLLER PROVIDING FLEXIBLE BOARD DESIGN AND CONTROLLING METHOD THEREOF

CLAIM OF PRIORITY

This application makes reference to, and claims all benefits accruing under 35 U.S.C. §119 from an application for SMALL-SIZED BASE STATION CONTROLLER PROVIDING FLEXIBLE BOARD DESIGN AND CONTROLLING METHOD THEREOF earlier filed in the Korean Intellectual Property Office on 15 Jan. 2003 and there duly assigned Serial No. 2003-2825.

BACKGROUND OF THE INVENTION

1. Field of the Invention

The present invention relates to a base station controller and, more particularly, to a base station controller wherein the base station can be small-sized in order that it is to be installed in a rack of the base station and the number of boards installed in a backboard can be flexibly increased or decreased according to a subscriber capability.

2. Description of the Related Art

Generally, a private wired communication service for voice communication on a premises was provided by a private exchange (or a key phone system), and a communication service for data was provided by a LAN switch and a router using a server.

Normally, while mobile communication can provide a service almost everywhere without restricted areas, such as the premises, this service makes use of a mobile communication service system, which is charged a separate fee to wirelessly communicate in a predetermined area.

That is, when a terminal of a wired private exchange and a mobile terminal of a mobile communication service subscriber are to communicate with each other, both exchanges are connected to a public network and a call of one party is connected to the other party.

Here, the public network includes a mobile communication network and a public telephone exchange network. Accordingly, even when a wired subscriber and a mobile communication service subscriber speak over the telephone to each other in a building, they have to charge a separate fee.

Therefore, a private mobile communication service system has been developed, which enables the wired subscriber and the mobile communication service subscriber to speak over the telephone without any charge when they try to speak over the telephone in a building (here, a conventional mobile communication service system is denominated as a public mobile communication service system so as to separate it from the private mobile communication service system).

The private mobile communication service system enabled a mobile communication subscriber registered in the private mobile communication service system to provide another mobile communication subscriber registered in the private mobile communication service with a call service, or vice versa in an area where the private mobile communication service is provided without any charge, using an extension connected to a private exchange.

FIG. 1 is a view explaining a concept of public/private mobile communication services.

In order to provide the public and private mobile communication services altogether, there are provided a public/private sharing cell area 114 which is a public/private sharing communication service area, and a public/private communication service unit 112 as shown in FIG. 1.

In order to separate base stations (BTSs), a.k.a., base transceiver stations, included in the public mobile communication service system, that is, BTSs (106-1, . . . 106-k, 108-1) shown in FIG. 1 as examples from a private base station 108-k in the public/private sharing cell area 114, the private base station 108-k is denominated as a pBTS (a private BTS).

The pBTS 108-k constitutes a wireless communication line together with a mobile station (MS) 124 included in the public/private sharing cell area 114, performs a management of wireless resources, and is connected to a base station controller (BSC) of the public mobile communication service system, that is, a BSC 104-m shown in FIG. 1 through the public/private communication service unit 112.

The public/private communication service unit 112 is connected to the BSC 104-m, a public switched telephone network/integrated service digital network (PSTN/ISDN) 116, and an Internet protocol (IP) network 118 of the public mobile communication service system. The public/private communication service unit 112 performs a mobile communication service in order that the public mobile communication service and a private mobile communication service can be selectively provided to mobile stations (MSs) in the public/private sharing cell area 114, for example, an MS 124 of FIG. 1.

If the MS 124 is registered in the public/private communication service unit 112 to be provided with the private mobile communication service, the MS 124 can receive the private mobile communication service as well as the public mobile communication service.

However, if the MS 124 is not registered in the public/private communication service unit 112 to be provided with the private mobile communication service, the MS 124 can be provided with only the public mobile communication service. Also, the public/private communication service unit 112 performs a wired communication service with the PSTN/ISDN 116 and the IP network 118.

On the other hand, a difference between the private mobile communication service system and the public mobile communication service system when installing the base station (BS) and the base station controller (BSC) is that how closely the private base station (pBS) and the base station controller (BSC) can be installed.

FIG. 2 is a view showing a conceptual construction of a private mobile communication service system, which shows that a private base station 232 and a private base station controller 230 can be installed in the same place and closely in the private mobile communication service system differently from the case of a conventional public mobile communication system where the base station and the base station controller are installed separately so that needed signals are transmitted and received between them using an E1/T1 link.

Furthermore, the private mobile communication service system can have the private base station 232 and the private base station controller 230 installed in a rack, and such an installation of the private base station 232 and the private base station controller 230 in the rack can result in a reduced-cost effect in constructing the private mobile communication service system.

Furthermore, the private mobile communication service system can be small-sized in the situation that the private mobile communication service system is generally constructed in a building or the like.

FIG. 3 is a view showing a conceptual construction of a private base station controller installed in a rack.

Referring to FIG. 3, it is seen that the private base station controller is installed in a rack constructed with four shelves.

A first shelf 310 has two ACMA (ATM (asynchronous transfer mode) Cell Mux/Demux board Assembly) boards constructing an ASB (ATM Switch Block) of a BAN (BSC ATM switch Network) which provides a communication path between processors in the private base station controller and a communication path between the private base station and the public base station controller, and eight TCLA (Transcoder Control and Link board Assembly) boards constructing a TCB (Transcoder Bank) which has a vocoder, converts PCM (pulse code modulation) data to 8K QCELP/ EVRC or 13K QCELP data, and QCELP (Qualcomm Code Excited Linear Prediction) or EVRC (Enhanced Variable Rate Coder) data to PCM data.

A second shelf 320 has two ACMA boards constructing an ASB of a BAN, two BHPA (BSC High Performance Processor board Assemblies) boards constructing a BMP (BSC Main Processor) which performs functions of a call processing of a private base station controller, a No. 7 signal (SS7) processing and an ATM link control, which is a main control block, two ASFA (ATM Switch Fabric board Assemblies) boards which provide a communication path between the BMP and another processor by constructing the ASB of the BAN, one HACA (Hardware Alarm Collection board Assembly) constructing an HAB (Hardware Alarm Collection Block) which collects hardware error information occurred in each block in the private base station and informs the BMP (BSC Main Processor) of the information, and one ASIA (ATM STM-1 interface board Assembly) board constructing an ALB (ATM Link Block) of the BAN.

Also, a third shelf 330 has two GCRU (GPS (global positioning satellite) Clock Receiver Unit) boards constructing an NSB (Network Synchronization clock distribution Block) which generates a network synchronization clock with a clock received from the GPS and time information and provides a needed block with the synchronization clock, three MCDA (Master Clock Distribution board Assembly) boards, two ACMA boards constructing the ASB of the BAN, and three AETA (ATM E1/T1 interface board Assembly) boards constructing the ALB.

Also, the lowest shelf 340 has two ACMA boards constructing the ASB of the BAN, and eight BHPA boards constructing an ATP (Air Termination Processor) which processes signals such as a handoff signal and a power control signal which is received together with traffic data after the call has been established and performs an RLP (Radio Link Protocol) or MAC (Media Access Control) function for the data call.

However, it is required that the private base station controller becomes small-sized in order to install the private base station and the private base station controller in a rack.

Also, in the case that the private base station controller becomes small-sized and installed in the private base station, it is required that a board is designed flexibly according to its installation place and the number of required boards is increased or decreased according to a subscriber capacity.

SUMMARY OF THE INVENTION

It is, therefore, an object of the present invention to provide a private base station controller which is small-sized to be installed in a private base station of a private mobile communication service system and meets the needs of low cost and small size of a mobile communication service provider.

It is another object of the present invention to provide a private base station controller that provides design flexibility in order that the number of required boards can be increased or decreased according to an installation environment.

According to an aspect of the present invention, there is provided a small-sized base station controller providing a flexible board design, comprising: a Network Synchronization clock distribution Block (NSB) for generating a plurality of system synchronization clocks and network synchronization clocks using a synchronization clock received from a GPS satellite and distributing the clocks to each shelf in a base station; an Air Termination Processor (ATP) block to be used to match with a mobile terminal in a wireless environment; a TAB block (TransCord & ATM E1/T1 Link Block) having an ALB block (ATM E1/T1 Link Block) for providing an interface between networks and a TCB (TransCord Bank) block for processing voice compression signals transmitted through a base station from a mobile terminal and PCM data transmitted to an exchange; and an MCB block (Main Control Block) for loading corresponding OSs (Operating Systems) with respect to the NSB block, ATP block and TAB block using backboard identifiers, and collecting switching of signals and all generated alarm signals.

Preferably, the NSB block comprises a GCRU (GPS Clock Receiver Unit) board for receiving a synchronization clock and time information from the GPS satellite and providing each installed shelf with the received time information, and generating and outputting a plurality of system synchronization clock signals on the basis of the received synchronization clocks; and an MCDA (Main Clock Duplication Assembly) board for receiving the plurality of system synchronization clock signals from the GCRU board and distributing the signals to each shelf, and generating another plurality of network synchronization clocks using the system synchronization clock received from the GCRU and distributing the generated synchronization clock signals to the shelf.

Preferably, the ATP block includes a plurality of BHPA (BSC High Performance Processor board Assembly) boards for processing signals received together with traffic data and performing RLP or MAC functions with respect to data call; and an ACMA (ATM Cell Mux/Demux board Assembly) board for multiplexing and outputting an ATM cell inputted from the BHPA, demultiplexing the transmitted ATM cell and distributing the demultiplexed ATM cell to the BHPA, and including a UTOPIA (Universal Test & Operations PHY (physical) Interface for ATM) interface and performing an ATM communication.

Preferably, the plurality of BHPA boards include a first BHPA board for processing a control signal for the traffic data; a second BHPA board for processing circuit data; and a third BHPA board to be interworked with a PDSN (Public Data Switching Network) in order to process packet data.

Preferably, the TAB block includes a plurality of AETA (ATM E1/T1 interface board Assembly) boards for constructing the ALB block, including an E1 interface unit, an ATM layer interface unit and an inter-processor communication unit, and transmitting and receiving the ATM cell through a network connected to the E1/T1; an ACMA (ATM Cell Mux/Demux board Assembly) board for multiplexing and outputting the ATM cell inputted from the AETA and TCLA (Transcoder Control and Link board Assembly), demultiplexing the transmitted ATM cell and distributing the ATM cell to the AETA and TCLA, and including the UTOPIA interface and performing the ATM communication; and a plurality of TCLA (TCLA: Transcode Control and Link Assembly) board for converting a voice compression signal transmitted from the mobile terminal through the base station into PCM data and transmitting the signal to the exchange, converting PCM data transmitted from the exchange into the voice compression signal and transmitting the signal to the mobile terminal through the base station.

Preferably, the TAB block may include three sheets of the AETA boards and two sheets of the TCLA boards, or two sheets of the AETA boards and three sheets of the TCLA boards.

Preferably, the MCB block includes a BHPA board for loading a corresponding OS (operating system) and program with respect to the NSB and ATP blocks using a backboard number, a backboard ID and a slot ID (slot number) and controlling the loaded program, and loading the corresponding OS and program with respect to the TAB block using a backboard ID determined in accordance with the backboard number, backboard ID, slot ID and an installation construction of a board and controlling the loaded program; an ASFA (ATM Switch Fabric Board Assembly) board for including ATM switch fabrics and performing an ATM switch operation; and an HACA (Hardware Alarm Collection Board Assembly) board having an HAB (Hardware Alarm Collecting Block) which collects alarm information generating in each block of the base station controller, wherein each of the BHPA, ASFA and HACA boards has a double construction.

Preferably, a pair of BHPA boards, a pair of ASFA boards and a pair of HACA boards which have the double constructions are connected using a fast Ethernet.

Preferably, the number of the backboard ID is identical with the number of TCLA boards installed on the shared backboard of the TAB block.

According to another aspect of the present invention, there is provided a method for controlling a base station controller, comprising: a first step of checking a state of a board by performing a POST (Power On Self Test) by a BMP (BSC Main Processor) when the base station controller is powered on; a second step of searching for a board to be booted and reading out board installation environment information (PCI Configuration) for the checked board from a database by the BMP; a third step of identifying backboard and slot IDs of the read board installation environment information and determining whether the board to be booted is included in a TAB block; and a fourth step of a), in case that the board to be booted is included in the TAB block as a result of the determination, identifying a corresponding OS (Operating System) using the backboard number and backboard ID in the board installation environment information, loading the identified OS to the board and performing a booting, and b), in case that the board to be booted is not included in the TAB block as a result of the determination, identifying a corresponding OS (Operating System) using the backboard number and slot ID in the board installation environment information, loading the identified OS to the board and performing a booting.

Preferably, the second step includes a) a step of, in case that there is no defect in a hardware of the board, requesting a selection key value to select the board to be booted, and searching for whether there is the board to be booted, by the BMP; and b) a step of, in case that the board to be booted is searched out as a result of the search, searching for the board installation environment information (PCI Configuration) of the corresponding board from a database.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIGS. 5A, 5B and 5C show different embodiments of the TAB block of FIG. 4; and FIG. 6 is a flow chart of a control method of the private base station controller of FIG. 4.

DETAILED DESCRIPTION OF THE INVENTION

Figure 1:
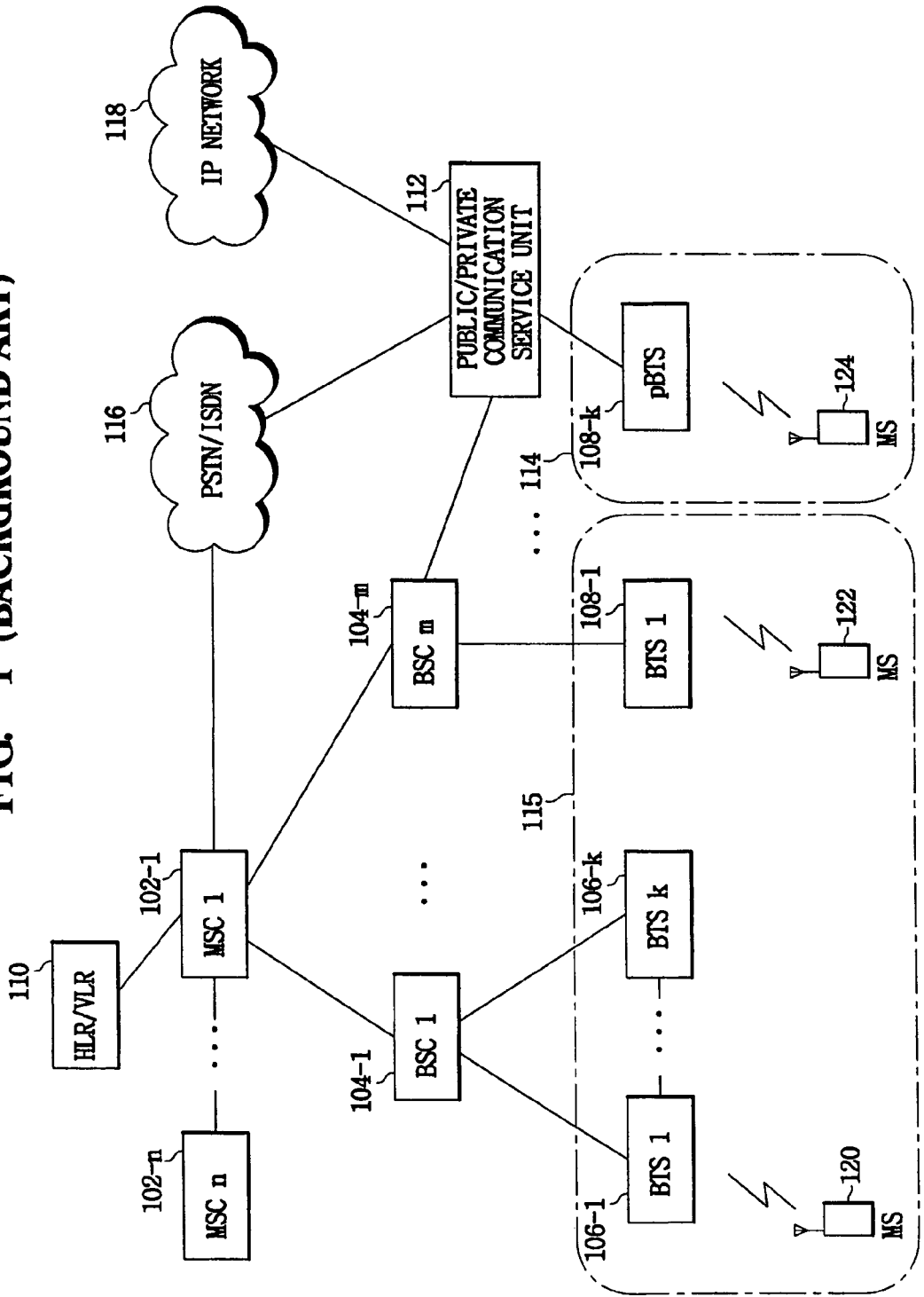
FIG. 1 is a view explaining a concept of a public and a private mobile communication services.
Figure 2:
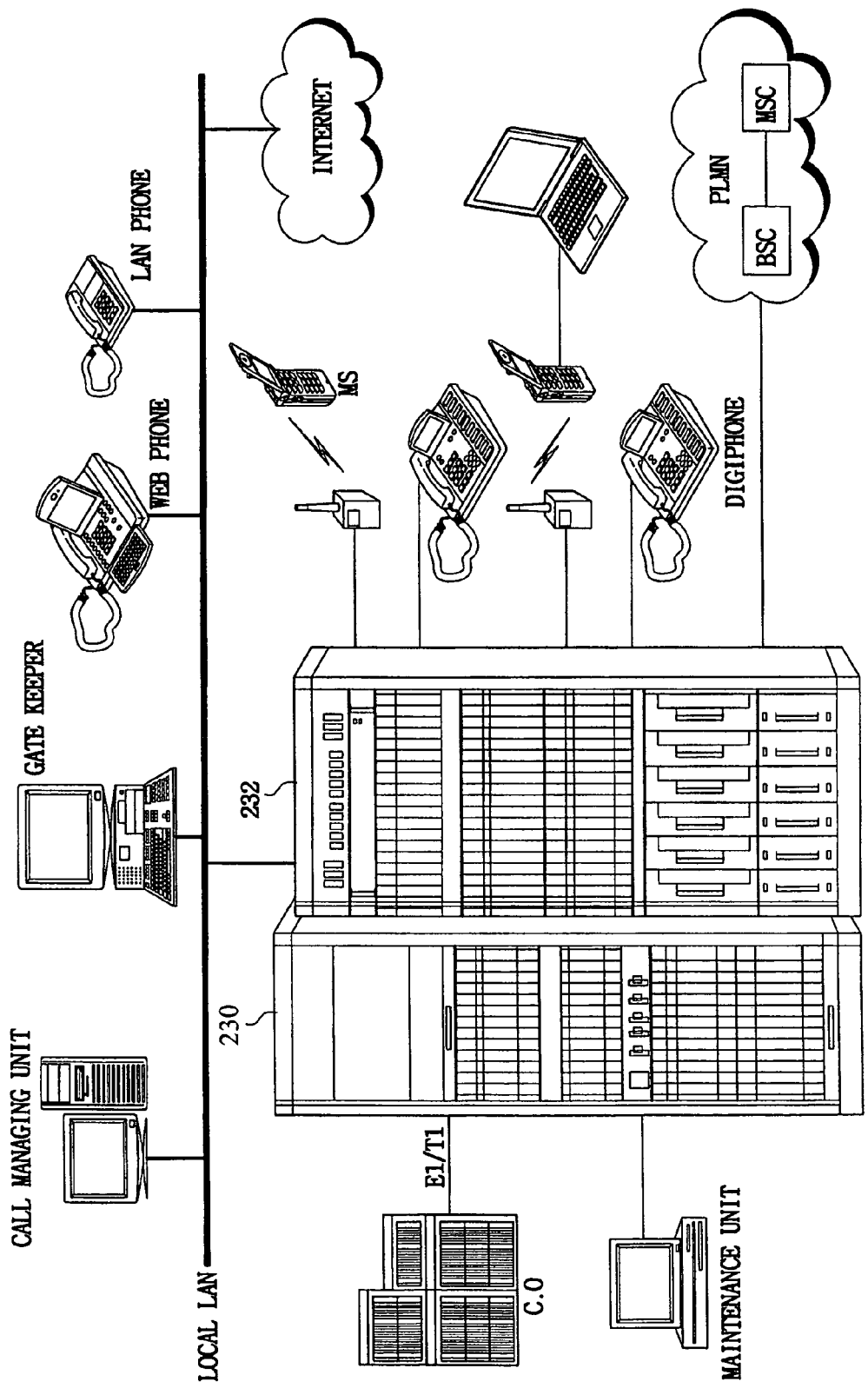
FIG. 2 is a view showing a conceptual construction of a private mobile communication service system.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout the specification.

Hereinafter, a preferred embodiment of the present invention will be explained in detail with reference to FIGS. 4 to 6.

Figure 4:
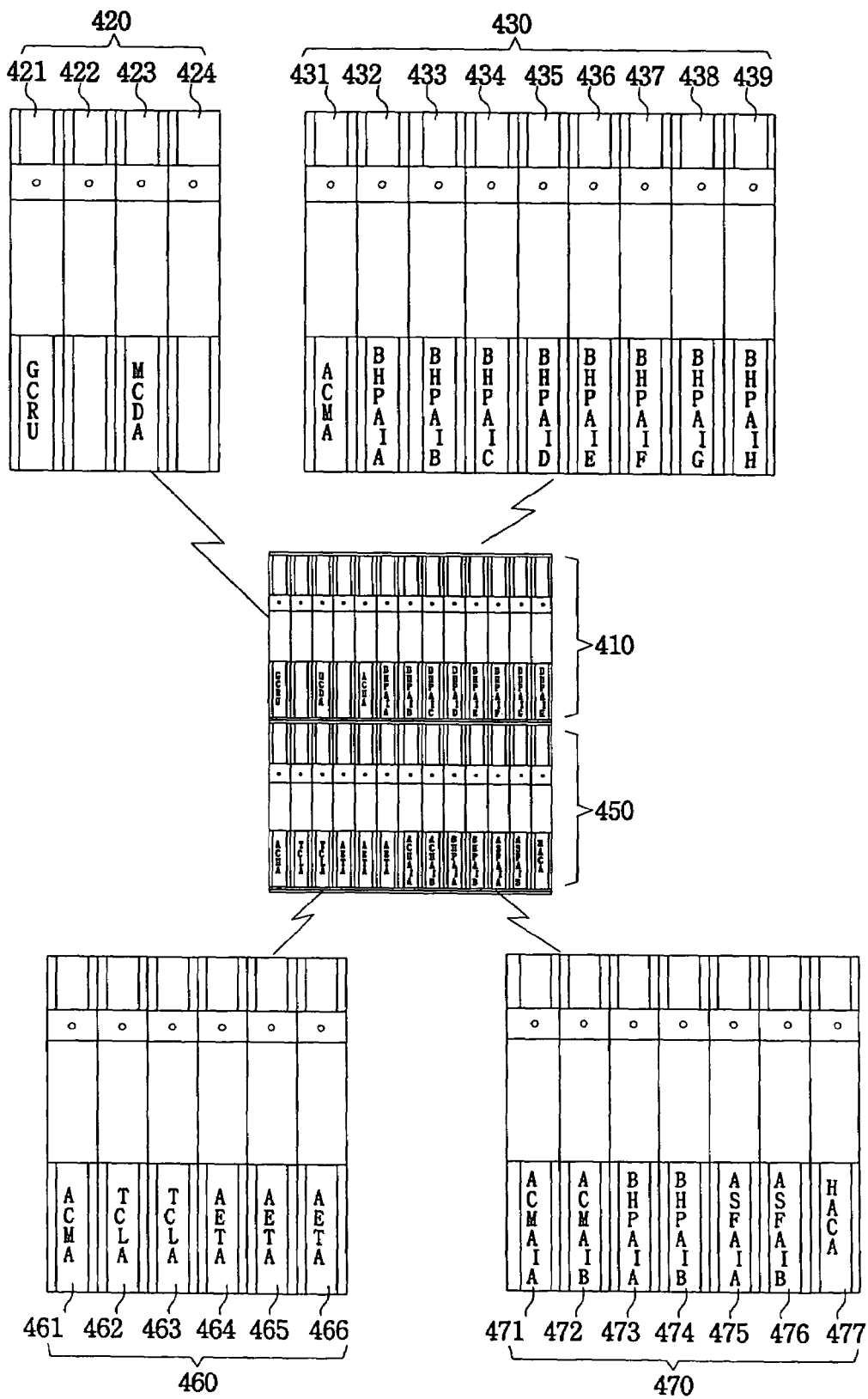
FIG. 4 is a view showing a construction of a small-sized private base station controller installed in a rack in accordance with an embodiment of the present invention.

FIG. 4 is a view showing a construction of a small-sized private base station controller installed in a rack in accordance with an embodiment of the present invention.

Referring to FIG. 4, the small-sized private base station controller in accordance with the embodiment of the present invention is installed in a 19" (19 inch) rack as a single body with a private base station (pBTS), and constructed with only two shelves and four blocks entirely, each shelf being 6U (1U=44.45 mm).

The private base station controller is installed in two shelves (410 and 450), each shelf being capable of installing thirteen boards.

Unique functions of the private base station controller are embodied in each board, and these boards are newly loaded or unloaded by an operator in its operation.

A first block 420 of an upper shelf 410 is an NSB block (Network Synchronization clock distribution Block), and a second block 430 is an ATP (Air Termination Processor) block to match with a mobile terminal in a wireless environment.

A first block 460 of a lower shelf 450 is a TAB block (Transcoder and ATM link interface Block) constructed by coupling a TCB (Transcoder Bank) to an ALB (ATM Link interface Block), and a second block 470 is an MCB (Main Control Block) which performs entire control of pBSC and an ATM switch, and collects all alarm signals in the pBSC.

The NSB block being the first block 420 of the upper shelf 410 includes four slots 421 to 424, and the ATP block being the second block 430 includes nine slots 431 to 439.

The NSB block 420 generates a network synchronization clock with a clock 1PPS and time information TOD (Time of Day) which are received from a GPS satellite, and distributes the network synchronization clock into the private base station controller and the private base station.

The NSB block 420 includes a GCRU (GPS Clock Receiver Unit) board 421 which receives a synchronization clock and time information from the GPS satellite and generates 4.096 MHz, 1.544 MHz and even second (0.5 Hz) signals of high precision on the basis of the synchronization clock and the time information, and an MCDA (Main Clock Duplication Assembly) board 423 which receives a synchronization clock from the GCRU board 421 and matches its phase with the received clock, and generates 8 KHz and the even second signals and transmits the signals to each shelf in the private base station and the private base station controller.

The GCRU board 421 transmits the received TOD information to BHPA (BSC High Performance Processor board Assemblies) boards 473 and 474, and the BHPAs 473 and 474 transmits the TOD information to the all other blocks 430 and 460 in real time. The BHPAs 473 and 474 boards form a BMP (BSC Main Processor) which takes charge of the entire control of the private base station controller.

Here, in order that the private mobile communication service system becomes low cost and small-sized, the synchronization clock and the time information are transmitted from the GPS satellite through a GPS antenna using one GCRU 421 and provided to the private base station controller and the private base station simultaneously.

The GCRU board 421 receives a position information reference from three or more GPS (Global Position System) satellites, measures a correct time and distance, and precisely calculates a current position by using a triangle method with three distances different with one another. Generally, the GCRU board 421 includes a reference clock generation unit which generates a system clock using the time information provided from the GPS satellite.

The reference clock generation unit included in the GCRU board 421 includes a GPS module that receives a position reference signal and time information transmitted from the GPS satellite positioned above the base station, and generates and outputs a clock signal of 10 MHz through an internal phase locked loop (PLL) unit, and a phase locked loop which generates system clock signals of 4.096 MHz, 1.544 MHz and even second (0.5 Hz) using the clock signal of 10 MHz inputted from the GPS module.

The GCRU board 421 outputs the system clock signals generated from the reference clock generation unit to the MCDA board 423.

The MCDA board 423 corrects the phase of the clock signals received from the GCRU 421 for output, and generates 8 KHz and even second signals, and provides each shelf in the private base station and private base station controller with the signals.

The kind of clock signals and the number of ports outputted from the MCDA board 423 are as follows:

1) 4.096 MHz: 16 ports for hardware block of the pBSC and pBTS;
2) 1.544 MHz: 4 ports for AETA block of the pBSC;
3) 8 kHz: 12 ports for hardware block of the pBSC and pBTS; and
4) Even second: 16 ports for hardware block of the pBSC and pBTS.

On the other hand, each board of the private base station (pBTS) and private base station controller (pBSC) performs a call processing function of the mobile terminal which is received and synchronized with the clock signal received from the MCDA 423.

Next, the ATP block 430 performs a voice and data call processing function and a power control and handoff function, and an MAC control and RLP function for a data service.

The ATP block 430 includes one ACMA (ATM Cell Mux/Demux board Assembly) board 431 which takes charge of an Air Interface in the pBSC and provides a communication path of ASFA boards 475 and 476, and six to eight BHPA (BSC High Performance Processor board Assembly) boards 432 to 439. The power is supplied to the ATP block when the BHPA boards 432 to 439, which have been unloaded, are loaded, and constructions in the BHPA boards 432 to 439 are initialized when the power is supplied.

At this time, the initialization is performed after a predetermined time is lapsed from the time when the power is supplied, since it is intended that an operation is made after the first power is supplied and then each construction is stabilized.

The ACMA board 431 of the ATP block 430 performs a multiplex/demultiplex function of an ATM cell and a UTOPIA interface function and provides a communication path with the ASFA boards 475 and 476.

And, the BHPA boards 432 to 439 of the ATP block 430 includes two BHPA boards 432 and 433 processing a control signal for traffic data, two BHPA boards 434 and 435 processing circuit data, and two BHPA boards 436 and 437 which interwork with the PDSN (Public Data Switching Network) for processing packet data since some functions of the PDSN are mounted in the BHPA boards 436 and 437 and can directly access the PDSN by means of the Internet protocol, and two boards 438 and 439 are reserved for, for example the recently implemented CDMA2000 1xEV-DO standard.

The two BHPA boards 436 and 437 interworking with the PDSN to process the packet data use a MAC layer in order to transmit/receive the packet data through an air interval.

The MAC layer is included in each of the mobile terminal and the private base station controller, and includes a Radio Link Protocol (referred to as an RLP, hereinafter) entity, and a Radio Burst Protocol (referred to as RBP, hereinafter) entity.

The RLP is a protocol suitable in case that a large amount of data should be transmitted sequentially and is used when data are transmitted through a dedicated traffic channel. And, RBP is a protocol suitable in case that data of a burst property frequently occurred are transmitted and is used when data are transmitted through a common traffic channel or a dedicated MAC channel.

The MAC layer does not generate the RLP entity and the RBP entity simultaneously in a determined time. The MAC layer performs an efficient channel assignment operation in order to transmit the packet data according to a channel resource.

At this time, the MAC layer transits a kind of data and signaling signals inputted according to a service quality and reliability request of an upper layer to a corresponding state, and multiplexes or demultiplexes them.

The TAB block being the first block 460 of the second shelf 450 is a combined block of an ALB(ATM E1/T1 Link interface Block) block 464 to 466 (i.e., AETA (ATM E1/T1 Link interface board Assembly) boards 464, 465 and 466) which provide an E1/T1 link for connecting to the private base station controller and the public base station controller and TCB (TransCoder Bank) block 462 and 463 (i.e., TCLA (Transcoder Control and Link board Assembly) boards 462 and 463) which convert a compressed voice signal received from the mobile terminal through the private base station to 64k PCM data using digital signal processor and transmit the data to a PABX (Private Branch Automatic eXchange) or PBX (Private Branch Exchange) by way of the E1/T1 link or, vice versa.

Referring back to FIG. 3 which has a rack construction of a private base station controller in accordance with a conceptual art, it is noted that the TCB block is installed on the most upper shelf 310 and formed of two ACMA boards and eight TCLA boards.

Figure 3:
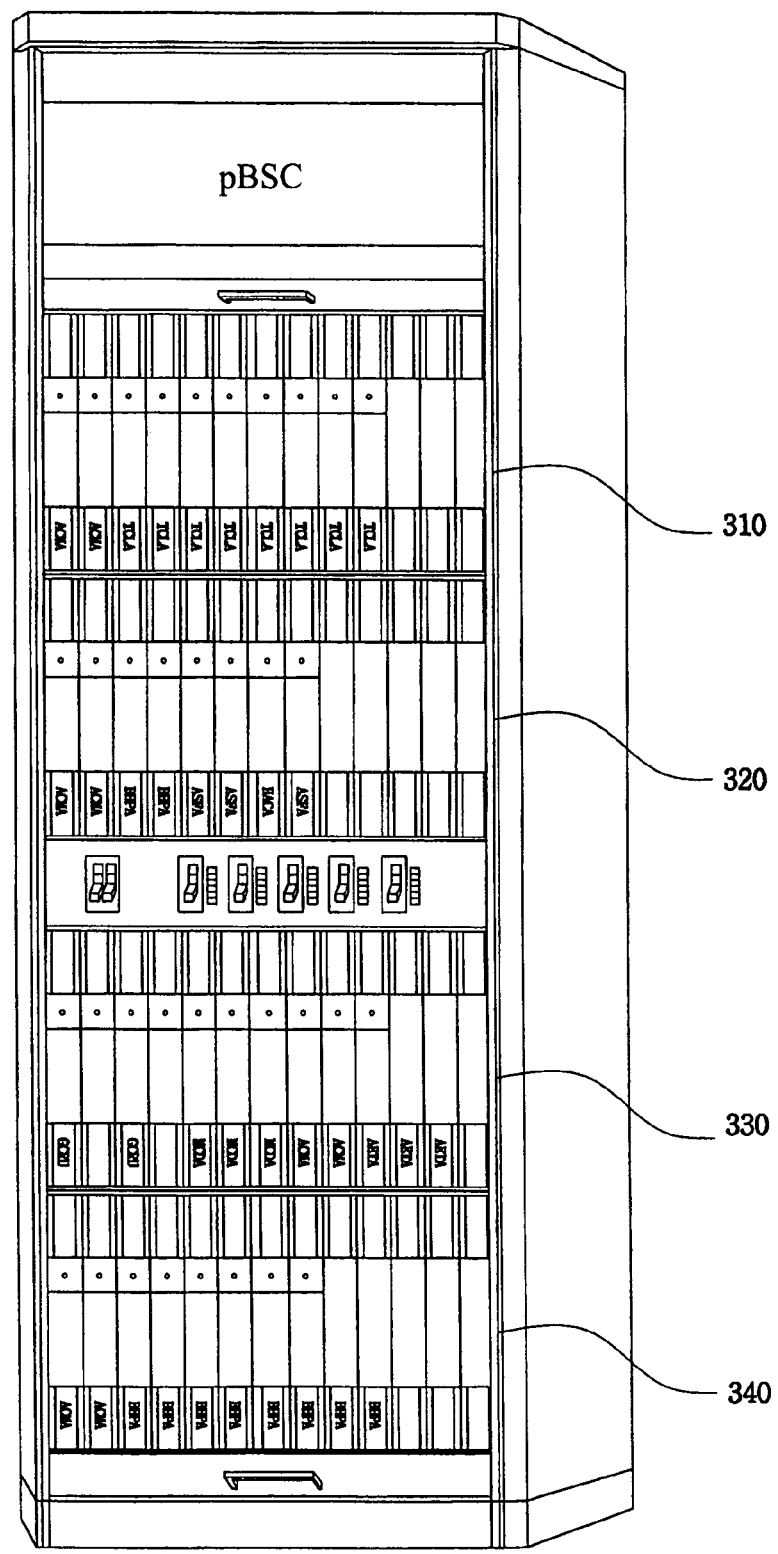
FIG. 3 is a view showing a conceptual construction of a private base station controller installed in a rack.

Also, referring to FIG. 3, it is noted that an ALB block is positioned in the right side of the third shelf 330 from the top, and formed of two ACMA boards and three AETA boards.

However, in accordance with the present invention, the ALB block 464 to 466 and the TCB block 462 and 463 are installed in a TAB block (TCB+ALB) 460 in order to make the private base station controller small, which is different from an existing large capacity public base station, that is, the boards in the present invention share a backboard, so that the TCLA boards 462 and 463 and the AETA boards 464 to 466 are increasingly or decreasingly installed reciprocally according to a subscriber capacity.

At this time, since the ALB block 464 to 466 and the TCB block 462 and 463 are installed in one TAB block 460 so that it is possible to install only one sheet by sharing an ACMA board 461, it is discriminated from the conventional art where at least two ACMA boards should be installed.

The TAB (TCB+ALB) block 460 is constructed as total five slots, wherein each slot is constructed from two TCLA+ three AETA to four TCLA+one AETA according to the subscriber capacity.

FIGS. 5A to 5C are views showing constructions of various TAB blocks for the TAB block of FIG. 4. FIG. 5A includes one sheet of an ACMA board, two sheets of TCLA boards, and three sheets of AETA boards. FIG. 5B includes one sheet of an ACMA board, three sheets of TCLA boards, and two sheets of AETA boards. FIG. 5C includes one sheet of an ACMA board, four sheets of TCLA boards, and one sheet of an AETA board.

However, in case that the ALB block 464 to 466 and the TCB block 462 and 463 are installed in the TAB block 460, it should be considered that clock signals used in the two blocks are different from each other.

In order to solve the problem, 2 clock cables are used in order that each of the TCLA boards 462 and 463 and each of the AETA boards 464 to 466 is provided with a clock in the MCDA 423 of the NSB block 420.

By doing this, clock signals required in the TCLA boards 462 and 463 and the AETA boards 464 to 466 are provided so that a problem occurred by a reason that the clock signals used in the two boards are different is solved.

Here, the ALB block 464 to 466 provides not only the private base station and the private base station controller with communication paths therebetween but also the public base station controller and the private base station controller with communication paths therebetween.

That is, the ALB block 464 to 466 is positioned between the private base station and the private base station controller, and between the public base station controller and the private base station controller so that they support all data to be exchanged by the BAN(BSC ATM switch Network) which is constructed by the ATM switch, and support connections by the ATM-E1/T1 between the private base station and the private base station controller and between the public base station controller and the private base station controller.

Each of the AETA (ATM E1/T1 interface board Assembly) boards 464 to 466 of the ALB block 464 to 466 includes an E1 interface unit, an ATM layer interface unit, and an inter-processor communication unit, and is connected to the public/private base station controller and the private base station using the E1/T1 and transmits and receives the ATM cell.

That is, the AETA boards 464 to 466 transfer the ATM cell received from the public/private base station controller or the private base station to the BHPAs 473 and 474 through the ACMA board 461 or transmit the ATM cell received from the BHPAs 473 and 474 through the ACMA board 461 to the public/private base station controller or the private base station.

Here, the E1 interface unit of the AETA boards 464 to 466 is constructed as a line interface unit (LIU) and an E1 framer, and is directly connected to the private base station or the public/private base station controller through the E1 interface unit. The E1 interface unit performs functions of arranging data as an E1 format and detecting all kinds of alarms.

The ATM layer interface unit receives a data stream of the E1 format from the E1 interface and reassemblies the data as a 53 byte cell, and reversely makes a segmentation of the ATM cell and transmits the ATM cell to the E1 interface unit as the E1 stream.

The inter-processor communication unit is constructed as an FIFO (first-in first-out) for exchanging all kinds of information between a processor in the board and processors of other blocks/boards, and exchanges information with other boards in an ATM cell unit.

The E1 interface unit is a board designed to transmit and receive data between the public/private base station controller and the private base station, and the data transmission and reception standard is designed as CEPT (Conference of European Postal and Telecommunications) E1 mode (a.k.a., E1). CEPT E1 is a standard used in Europe for digital telephone carriers and is similar to T1 but operates at 2.048 Mbps and has 32 digital channels instead of T1's 24 digital channels on a single 1.544 Mbps carrier.

A bipolar signal inputted through a transmission line at a speed of 2048 Kbps is converted into a digital signal through a waveform shaping circuit of the line interface unit (LIU). Also, the line interface unit extracts a clock and PCM data from a signal inputted through the transmission line, decodes them with HDB3 (High Density Bipolar 3), checks a bipolar error LOS (Loss Of Signal), and transfers them to an E1 frame generator.

The E1 frame generator arranges the clock and PCM data as a frame matched with the E1 format, reports all kinds of frames related alarm information, and transfers them to the ATM layer interface unit. Then, the ATM layer interface unit reassemblies 30 channel data excluding time slots No. 0 and No. 16 from the received E1 frame as a 53 byte ATM cell.

That is, the ATM layer interface unit transfers the ATM cell to the ACMA board 461 through a four cell FIFO according to a UTOPIA access protocol.

The ACMA board 461 multiplexes the ATM cell inputted from the ATM layer interface unit or inter-processor communication unit of the TCLA boards 462 and 463 and the AETA boards 464 to 466 and transmits them to other blocks through the ASFA boards 475 and 476.

Also, reversely, the ACMA board 461 checks a VPI (Virtual path identifier) and a VCI (Virtual channel identifier) of the ATM cell received from the other blocks and distributes them into FIFOs of the corresponding ATM layer interface unit or the inter-processor communication unit in cell units. The cell transferred to the ATM layer interface unit as described above is converted to the E1 stream again, transmitted to the private base station or the public/private base station controller through the E1-ATM interface unit, and transferred to the inter-processor communication unit.

On the other hand, each of the TCLA boards 462 and 463 of the TCB block 462 and 463 has a vocoder function and a gateway function for having access to the PBX, and the number of the TCLA boards depends on the number of admissible calls.

The TCLA boards 462 and 463 convert a subscriber traffic signal such as 8 k/13 k QCELP and 8 k EVRC received through the ACMA board 461 to 64 k PCM data through a DSP (digital signal processor) signal, or vice versa.

The DSP used here has 16 ports per the TCLA boards 462 and 463, each DSP vocoding 8 channel data. The TCLA boards 462 and 463 perform a function of data exchange between the E1/T1 channel and the DSP through a time switch in the TCLA boards 462 and 463.

A sheet of TCLA boards 462 and 463 accommodates a 120 channel vocoder, provides four E1 or five T1, and provides the TCLA one board with No. 7 signal channel of 64 kbps.

On the other hand, the MCB block (Main control block) being the second block 470 of the second shelf 450 includes the BHPA boards 473 and 474 installing the BMP (BSC Main Processor) which takes charge of the entire control of the private base station, the ASFA (ATM Switch Fabric Board Ass'y) boards 475 and 476 which includes ATM Switch Fabrics of the ASB (ATM Switch Block) of the BAN and performs the ATM switch operation, and an HACA (Hardware Alarm Collection Board Assembly) board 477 which installs HAB(Hardware Alarm Collection Block) collecting alarm information occurring in each block of the private base station controller.

Also, the MCB block includes an ACMA (ATM Mux/Demux Board Ass'y) board 471 which multiplexes the ATM cell or demultiplexes it in the reverse direction when the ATM cell is transmitted to or received from the board included in the MCB block 470, and performs attaching a tag during every connection.

The MCB block 470 makes the ASFA boards 475 and 476, the BHPA boards 473 and 474 and the ACMA boards 471 and 472 double for the purpose of product reliability, the doubled path being a fast Ethernet, and a default being sensed by informing other party's board of the states of each board.

Since the ASFA boards 475 and 476 being the ATM switching board and the HACA board 477 which receives alarms that have occurred in each block of the private base station controller do not have their own processors, the BHPAs 473 and 474 control the ASFA boards 475 and 476 through an ISA (Industry Standard Architecture) bus and performs the ATM switch operation. And the HACA board 477 is controlled through the ISA bus to read alarm information of each block.

The BMP (BSC Main Processor) includes a Main Configuration Handler (MCH), an IPC for inter-processor communication, an ATM performing data transmission and reception on an asynchronous transmission mode, and a DB of a Data Base, which are installed on the BHPA boards 473 and 474.

Simultaneously, the boards 421 to 424, 431 to 439, 461 to 466 and 471 to 477 are installed on a shelfback plane (not shown), each of the boards 421 to 424, 431 to 439, 461 to 466 and 471 to 477 exchanges all kinds of data through shared buses installed in the shelfback plane. The shared buses include a single 16 bit ATM cell bus for transmitting the ATM cell among each of the boards 421 to 424, 431 to 439, 461 to 466 and 471 to 477, a maintenance data bus (OAM Data Bus) for exchanging all kinds of data to perform a maintenance function of the MCB 470, and a local bus for transmitting other local data.

On the other hand, the boards 421 to 424, 431 to 439, 461 to 466 and 471 to 477 installed on the private base station controller operate after downloading an OS (operating system) and the required programs from WSM (Wireless System Manager) (not shown), the OS and required programs are loaded from WSM to BMPs 475 and 476, and from BMPs 475 and 476 to each of the boards 421 to 424, 431 to 439, 461 to 466 and 471 to 477.

At this time, a main construction information processing unit of the BMPs 475 and 476 searches for board establishment environment information (Configuration) of the boards 421 to 424, 431 to 439, 461 to 466 and 471 to 477 which are intended to boot when booting each of the boards 421 to 424, 431 to 439, 461 to 466 and 471 to 477 of the private base station controller, identifies the OS used in each of the boards 421 to 424, 431 to 439, 461 to 466 and 471 to 477, and transmits the identified OS information to the corresponding boards 421 to 424, 431 to 439, 461 to 466 and 471 to 477. This method is applied to all of boards 421 to 424, 431 to 439, 461 to 466 and 471 to 477 which are intended to boot.

Here, the board establishment environment information (PCI Configuration) referred to the database in order to load the OS by the BMPs 475 and 476 includes backboard numbers in which the boards 421 to 424, 431 to 439, 461 to 466 and 471 to 477 are installed, a backboard ID, and a slot ID.

The backboard number constructing the board establishment environment information is used to discriminate the backboard in which boards are installed, and each backboard has a sequence of 0, 1, 2, 3, . . . in the rack. And, as an example in accordance with the present invention, the backboard number of the first shelf is denoted as 0, the backboard number of the TAB block 460 is denoted as 1, and the backboard number of the MCB block 470 is denoted as 2.

And, the slot ID is an identifier identifying a slot on which a board is installed in the backboard, which is ordered 0, 1, 2, 3, . . . viewed from the left.

Accordingly, in order that the BMPs 475 and 476 load an OS desired by the boards 421 to 424, 431 to 439, 461 to 466 and 471 to 477 on the boards 421 to 424, 431 to 439, 461 to 466 and 471 to 477 which are to be booted when the BMPs 475 and 476 make a booting, backboard numbers of the bootboards 421 to 424, 431 to 439, 461 to 466 and 471 to 477 are identified firstly.

And, after identifying the backboard numbers of the boot boards, the OS corresponding to the slot IDs is loaded, wherein a user previously has to assign the backboard numbers and the slot IDs in the database of the BMPs 475 and 476 to manage them. For example, a database such as Table 1 may be managed.

TABLE 1

| Backboard number (backboard ID)/slot ID | 0 | 1 | 2 | 3 | 4 | 5 | 6 | 7 | 8 | 9 | 10 | 11 | 12 |
|---|---|---|---|---|---|---|---|---|---|---|---|---|---|
| 0 | GCRU | MCDA | ACMA | BHPA (ATP) | BHPA (ATP) | BHPA (ATP) | BHPA (ATP) | BHPA (ATP) | BHPA (ATP) | BHPA (ATP) | BHPA (ATP) | BHPA (ATP) | BHPA (ATP) |
| 1(02) | ACMA | TCLA | TCLA | AETA | AETA | AETA | | | | | | | |
| 1(03) | ACMA | TCLA | TCLA | TCLA | AETA | AETA | | | | | | | |
| 1(04) | ACMA | TCLA | TCLA | TCLA | TCLA | AETA | | | | | | | |
| 2 | ACMA | ACMA | BHPA (BMP) | BHPA (BMP) | ASFA | ASFA | HACA | | | | | | |

In case that the BMPs 475 and 476 load the OS on a board corresponding to the slot ID 5 of the backboard number 0, the BMPs 475 and 476 identify the BHPA boards for the ATP with reference to the Table 1 and load the corresponding OS.

On the other hand, the backboard ID should be noted among the Table 1, wherein the backboard ID is assigned in order to change the board construction of the TAB block 460 in accordance with an installation environment when the private base station controller is installed in a building or the like.

That is, a person who establishes the private base station controller may increase or decrease the TCLA boards 462 and 463 and the AETA boards 464 to 466 considering the installation environment, wherein the board construction can be easily changed by changing not all board name according to the slot ID in the board construction information environment in the database but only the slot ID.

For example, when the backboard ID is to be assigned by the number of TCLA installed on the backboard, the BMPs 475 and 476 recognize the backboard ID and determine that the number of the TCLA boards corresponding to the backboard ID is installed from the second board of the second backboard so that a corresponding OS can be loaded in the corresponding number of the TCLA board, and further boards can be recognized as the AETA boards and load the corresponding OS.

Here, even the explanation gives priority to the loading of the OS, the same method can be used in loading necessary programs and transmitting control signals.

FIG. 6 is a flow chart of a control method of the private base station controller of FIG. 4.

At first, power supply is applied to the private base station controller (step S110), the BMP checks what apparatus (hardware on the boards) is placed on the board and whether the apparatus operates properly by performing the POST (Power On Self Test) (step S112).

Next, if there is no problem in the hardware of the board, a boot loader requests a selection key value for selecting a board which performs the booting, and then searches for whether the board to perform the booting exists or not (step S114).

If the board to be booted is searched for in the step S114, the board establishment environment information (PCI Configuration) of the corresponding board is searched for (step S116). As described above, the board establishment environment information (PCI Configuration) includes backboard numbers in which the boards 421 to 424, 431 to 439, 461 to 466 and 471 to 477 are installed, a backboard ID, and a slot ID.

At this time, when the backboard number is 1 (one) as a result of the search, it is determined as a board corresponding to the TAB block and the backboard ID is searched for (step S120). Next, an OS to be installed on the corresponding board is identified according to the searched backboard ID. And, when the OS to be used by the corresponding board is identified, the boot loader is jumped into a boot area of the database (step S122), and the corresponding OS is read and loaded in a main memory of the board (step S124).

And, the OS is read from the main memory of the corresponding board and a booting is carried out (step S126). Next, the procedure proceeds to the step S116 if there exist more boards to be booted, and ends if there exists no board to be booted (step S128).

On the other hand, when the backboard number is not 1 as a result of the search in step S116, the board to be booted is not the board corresponding to the TAB block. So, when the corresponding board is identified as the used OS as a result of identifying the slot ID, the boot loader is jumped into the boot area of the database (step S122), the corresponding OS is read, and the OS is loaded into the main memory of the board (step S124).

And, the OS is read from the main memory of the corresponding board, and the booting is carried out (step S126). Next, the procedure proceeds to step S116 when there exist more boards to be booted, and ends when there exists no board to be booted (step S128).

Even though a procedure to load the OS was explained here, the same method can be used when loading programs required in each board, or transmitting the control signal.

Although the preferred embodiment of the present invention has been disclosed for private base station controller (pBSC), those skilled in the art appreciate that same method can be applied to a public network base station controller, and the scope of the present invention should be restricted not by the specified embodiment but by the appended claims. However, all acronyms used in the appended claims are defined by and restricted to the definitions set forth by this specification.

According to the present invention, using a small-sized pBSC which has been developed, it is possible to meet demand of market positively, and to construct a line-up of products together with existing large capacity of In-Building Solution.

Also, according to the present invention, it is possible to save much cost by not installing a GPS receiver unit in each system of pBSC and pBTS but sharing the GPS receiver unit, and to save cost and utilize space efficiently by installing both pBSC and pBTS systems in a 19" rack.

Also, according to the present invention, it is possible to save much cost by accommodating subscriber's increase without any special investment by providing a flexible design structure in which the corresponding board can be increased and decreased according to its capacity while sharing the same backboard.

What is claimed is:

1. A small-sized base station controller providing a flexible board design, including:
 a first shelf comprising:
  a Network Synchronization clock distribution Block (NSB block) for generating a plurality of system synchronization clocks and network synchronization clocks using a synchronization clock received from a Global Positioning System (GPS) satellite and distributing the clocks to each shelf in a base station; and
  an Air Termination Processor block (ATP block) to be used to match with a mobile terminal in a wireless environment; and
 a second shelf comprising:
  a TransCoder & ATM (asynchronous transfer mode) E1/T1 Link Block (TAB block) having an ATM E1/T1 Link interface Block (ALB block) for providing an interface between networks and a TransCoder Bank (TCB block) for processing voice compression signal transmitted through the base station from the mobile terminal and PCM (pulse code modulation) data transmitted to an exchange; and
  a Main Control Block (MCB block) for loading corresponding Operating Systems (OSs) with respect to the NSB block, ATP block and TAB block using backboard identifiers, controlling switching of signals and collecting all generated alarm signals.

2. The small-sized base station controller according to claim 1, wherein the NSB block comprises:
 a GPS Clock Receiver Unit (GCRU) board for receiving time information and the synchronization clock from the GPS satellite and providing each installed shelf with the received time information, and generating and outputting the plurality of system synchronization clock signals on the basis of the received synchronization clock; and
 a Main Clock Duplication Assembly (MCDA) board for receiving and correcting the phase of the plurality of system synchronization clock signals from the GCRU board and distributing the phase corrected system synchronization clock signals to each shelf, generating a network synchronization clock signal and an even second signal in response to at least one of the system synchronization clock signals received from the GCRU and distributing the network synchronization clock signal and an even second signal to each shelf.

3. The small-sized base station controller according to claim 1, wherein the ATP block includes a plurality of BSC (base station controller) High Performance Processor board Assembly (BHPA) boards for processing signals received together with traffic data and performing Radio Link Protocol (RLP) functions or Media Access Control (MAC) functions with respect to a data call; and
 an ATM Cell Mux/Demux board Assembly (ACMA) board for multiplexing and outputting an ATM cell inputted from the BHPA boards, demultiplexing the transmitted ATM cell and distributing the demultiplexed ATM cell to the BHPA boards, and including a UTOPIA interface and performing an ATM communication.

4. The small-sized base station controller according to claim 3, wherein the plurality of BHPA boards include a first pair of BHPA board for processing a control signal for the traffic data;
 a second pair of BHPA boards for processing circuit data; and
 a third pair of BHPA boards which interwork with a Public Data Switching Network (PDSN) for processing packet data.

5. The small-sized base station controller according to claim 1, wherein the TAB block includes a backboard shared by:
 at least one ATM E1/T1 Link interface board Assembly (AETA) board for constructing the ALB block, including an E1 interface unit connected to the base station, an ATM layer interface unit and an inter-processor communication unit, the AETA board transmitting and receiving an ATM cell through a network connected to an E1/T1 link;
 a plurality of Transcoder Control and Link Assembly (TCLA) boards for converting a voice compression signal transmitted from the mobile terminal through the base station into PCM data for transmission to the exchange, converting PCM data transmitted from the exchange into a voice compression signal for transmission to the mobile terminal through the base station; and
 an ATM Cell Mux/Demux board Assembly (ACMA) board for multiplexing and outputting the ATM cell inputted from the AETA board and TCLA boards, demultiplexing the transmitted ATM cell and distributing the ATM cell to the AETA board and TCLA boards, the ACMA board including a UTOPIA interface and performing ATM communication.

6. The small-sized base station controller according to claim 5, wherein the TAB block includes three AETA boards and two TCLA boards.

7. The small-sized base station controller according to claim 5, wherein the TAB block includes two AETA boards and three TCLA boards.

8. The small-sized base station controller according to claim 5, wherein the TAB block includes one AETA board and four TCLA boards.

9. The small-sized base station controller according to claim 5, wherein the MCB block includes a BSC (base station controller) High Performance Processor board Assembly (BHPA) board for loading a corresponding OS (operating system) and program with respect to the NSB block and ATP block using a backboard number, a backboard ID and a slot ID and controlling the loaded program, and loading the corresponding OS and program with respect to the TAB block using a backboard ID determined in accordance with the backboard number, backboard ID, slot ID and an installation construction of a board and controlling the loaded program;
 an ATM Switch Fabric Board Assembly (ASFA) board for including ATM switch fabrics and performing an ATM switch operation; and
 a Hardware Alarm Collection board Assembly (HACA) board having a Hardware Alarm collecting Block (HAB) which collects alarm information generating in each block of the base station controller.

10. The small-sized base station controller according to claim 9, further comprising two each of the BHPA, ASFA and HACA boards.

11. The small-sized base station controller according to claim 9, wherein a pair of BHPA boards, a pair of ASFA boards and a pair of HACA boards are connected using a fast Ethernet.

12. The small-sized base station controller according to claim 9, wherein a value of the backboard ID is identical with the number of TCLA boards installed on the backboard.

13. A method for controlling a base station controller (BSC), comprising:
- a first step of checking a state of a board by performing a Power On Self Test (POST) by a BSC Main Processor (BMP) when the base station controller is powered on;
- a second step of searching for a board to be booted and reading out board installation environment information (PCI Configuration) for the checked board from a database by the BMP;
- a third step of identifying backboard and slot IDs of the read board installation environment information and determining whether the board to be booted is included in a TransCoder & ATM (asynchronous transfer mode) E1/T1 Link Block (TAB block); and
- a fourth step of a), in case that the board to be booted is included in the TAB block as a result of the third step, identifying a corresponding Operating System (OS) using a backboard number and the backboard ID in the board installation environment information, loading the identified OS to the board and performing a booting, and b), in case that the board to be booted is not included in the TAB block as a result of the third step, identifying the corresponding OS (Operating System) using the backboard number and slot ID in the board installation environment information, loading the identified OS to the board and performing a booting.

14. The method according to claim 13, wherein the second step includes a) a step of, in case that there is no defect in a hardware of the board, requesting a selection key value to select the board to be booted, and searching for whether there is the board to be booted, by the BMP; and b) a step of, in case that the board to be booted is searched out as a result of the search, searching for the board installation environment information (PCI Configuration) of the corresponding board from the database.

* * * * *